(12) United States Patent
Knutson et al.

(10) Patent No.: US 6,847,627 B1
(45) Date of Patent: Jan. 25, 2005

(54) TIME-DIVISION MULTIPLE ACCESS (TDMA) MULTI-LINE WIRELESS TELEPHONE SYSTEM

(75) Inventors: Paul Gothard Knutson, Indianapolis, IN (US); Kumar Ramaswamy, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/581,146

(22) PCT Filed: Sep. 1, 1996

(86) PCT No.: PCT/US98/18090

§ 371 (c)(1),
(2), (4) Date: Nov. 13, 2000

(87) PCT Pub. No.: WO99/31827

PCT Pub. Date: Jun. 24, 1999

Related U.S. Application Data

(60) Provisional application No. 60/069,343, filed on Dec. 12, 1997.

(51) Int. Cl.$^7$ .............................................. H04B 7/212
(52) U.S. Cl. ..................... 370/347; 370/337; 455/463
(58) Field of Search ................................ 370/337, 347, 370/231–234, 253, 321, 442; 455/450, 421, 422.1, 462–464

(56) References Cited

U.S. PATENT DOCUMENTS 5,392,284 A      2/1995  Sugiyama
5,719,859 A  *  2/1998  Kobayashi et al. ......... 370/347
5,740,165 A  *  4/1998  Vannucci .................... 370/330
6,002,673 A  * 12/1999  Kahn et al. ................. 370/252

FOREIGN PATENT DOCUMENTS

EP             587225         3/1994      ............ H04M/1/72

OTHER PUBLICATIONS

International Telecommunication Union: "40, 32, 24, 16, kbit/s Adaptive Differential Pulse Code Modulation ADPCM" General Aspects of Digital Transmission Systems. Terminal Equipments, vol. 726, No G, Apr. 23, 1992, pp. 1–4, 6, 8–15.

* cited by examiner

*Primary Examiner*—Chi Pham
*Assistant Examiner*—Thai Hoang
(74) *Attorney, Agent, or Firm*—Joseph S. Tripoli; Joseph J. Kolodka

(57) ABSTRACT

A wireless telephone system comprises a base unit coupleable to one or more external telephone lines and having a base transceiver, and a plurality of wireless handsets which may be active or inactive. Each handset has a handset transceiver for establishing a time-division multiple access (TDMA) link, when said handset is active, over a shared RF channel with the base unit via the base transceiver. In communicating via a TDMA link, each active handset communicates during an exclusive time slice of a TDMA scheme that allocates time slices to active handsets, wherein a number of data samples having a sample size are transmitted during each time slice. At least two handsets alternatingly share a time slice, when one of said two handsets is to establish a new TDMA link and when establishing said new TDMA link would exceed the available channel capacity. Time slices are shared by reducing the sample size and thereby increasing the number of data samples transmitted during said shared time slices.

16 Claims, 3 Drawing Sheets

300

| DATA | AUDIO CHANNEL | | | | | | | |
|---|---|---|---|---|---|---|---|---|
| TD1 | TS1 (TS5) | RS1 (RS5) | TS2 (TS6) | RS2 (RS6) | TS3 (TS7) | RS3 (RS7) | TS4 (TS8) | RS4 (RS8) |
| RD1 | TS5 (TS1) | RS5 (RS1) | TS6 (TS2) | RS6 (RS2) | TS7 (TS3) | RS7 (RS3) | TS8 (TS4) | RS8 (RS4) |
| ... | ... | ... | ... | ... | ... | ... | ... | ... |
| ... | ... | ... | ... | ... | ... | ... | ... | ... |
| TDn | TS1 (TS5) | RS1 (RS5) | TS2 (TS6) | RS2 (RS6) | TS3 (TS7) | RS3 (RS7) | TS4 (TS8) | RS4 (RS8) |
| RDn | TS5 (TS1) | RS5 (RS1) | TS6 (TS2) | RS6 (RS2) | TS7 (TS3) | RS7 (RS3) | TS8 (TS4) | RS8 (RS4) |

| DATA | AUDIO CHANNEL | | | | | | | |
|---|---|---|---|---|---|---|---|---|
| TD1 | T1 (T5) | R1 (R5) | T2 (T6) | R2 (R6) | T3 (T7) | R3 (R7) | T4 (T8) | R4 (R8) |
| RD1 | T5 (T1) | R5 (R1) | T6 (T2) | R6 (R2) | T7 (T3) | R7 (R3) | T8 (T4) | R8 (R4) |
| TD2 | T1 (T5) | R1 (R5) | T2 (T6) | R2 (R6) | T3 (T7) | R3 (R7) | T4 (T8) | R4 (R8) |
| RD2 | T5 (T1) | R5 (R1) | T6 (T2) | R6 (R2) | T7 (T3) | R7 (R3) | T8 (T4) | R8 (R4) |
| TD3 | T1 (T5) | R1 (R5) | T2 (T6) | R2 (R6) | T3 (T7) | R3 (R7) | T4 (T8) | R4 (R8) |
| RD3 | T5 (T1) | R5 (R1) | T6 (T2) | R6 (R2) | T7 (T3) | R7 (R3) | T8 (T4) | R8 (R4) |
| TD4 | T1 (T5) | R1 (R5) | T2 (T6) | R2 (R6) | T3 (T7) | R3 (R7) | T4 (T8) | R4 (R8) |
| RD4 | T5 (T1) | R5 (R1) | T6 (T2) | R6 (R2) | T7 (T3) | R7 (R3) | T8 (T4) | R8 (R4) |
| TD5 | T1 (T5) | R1 (R5) | T2 (T6) | R2 (R6) | T3 (T7) | R3 (R7) | T4 (T8) | R4 (R8) |
| RD5 | T5 (T1) | R5 (R1) | T6 (T2) | R6 (R2) | T7 (T3) | R7 (R3) | T8 (T4) | R8 (R4) |
| TD6 | T1 (T5) | R1 (R5) | T2 (T6) | R2 (R6) | T3 (T7) | R3 (R7) | T4 (T8) | R4 (R8) |
| RD6 | T5 (T1) | R5 (R1) | T6 (T2) | R6 (R2) | T7 (T3) | R7 (R3) | T8 (T4) | R8 (R4) |
| TD7 | T1 (T5) | R1 (R5) | T2 (T6) | R2 (R6) | T3 (T7) | R3 (R7) | T4 (T8) | R4 (R8) |
| RD7 | T5 (T1) | R5 (R1) | T6 (T2) | R6 (R2) | T7 (T3) | R7 (R3) | T8 (T4) | R8 (R4) |
| TD8 | T1 (T5) | R1 (R5) | T2 (T6) | R2 (R6) | T3 (T7) | R3 (R7) | T4 (T8) | R4 (R8) |
| RD8 | T5 (T1) | R5 (R1) | T6 (T2) | R6 (R2) | T7 (T3) | R7 (R3) | T8 (T4) | R8 (R4) |

FIG. 4

TIME-DIVISION MULTIPLE ACCESS (TDMA) MULTI-LINE WIRELESS TELEPHONE SYSTEM

This application claims the benefit of provisional application No. 60/069,343, filed Dec. 12, 1997.

BACKGROUND OF THE INVENTION

1. Field of the Invention

The present invention relates to multi-line wireless telephone systems.

2. Description of the Related Art

The use of telephones and telephone systems, including wireless telephone systems, is widespread. In wireless telephone systems, a cordless or wireless telephone handset unit communicates via either analog or digital radio signals with a base unit, which is typically, connected via a standard telephone line to an external telephone network. In this manner, a user may employ the wireless handset to engage in a telephone call with another user through the base unit and the telephone network.

Multi-line wireless telephone systems are also in use in various situations, such as businesses with many telephone users. Such systems employ a handset that communicates with up to N handsets simultaneously, typically with digital communications schemes, such as time division multiple access (TDMA). It is desirable to implement the features of current private branch exchange (PBX) systems in a multi-line wireless telephone system. Conventional multi-line wireless telephone systems typically must work within a specified bandwidth and modulation format, which thus constrains the maximum capacity of the radio-frequency (RF) channel used to transmit signals between the base unit and the operating or active handsets.

One problem that arises due to the fixed capacity or bandwidth available for such telephone systems and the inflexibility of such systems is that the available channel capacity may be inefficiently utilized when not all handsets are operating. This is because, in some such systems, such as that disclosed for example, in European Patent Application No. 0 587 225 A2, the channel capacity is selected so that all N handsets can operate simultaneously, if necessary. However, when less than N handsets are operating, channel capacity is underutilized. Overall signal quality may be reduced in order to also reduce the total bandwidth (and thus the amount wasted when not all handsets are employed), but this reduces quality needlessly in some cases, for example where only one handset is operating and there is enough total channel capacity available to allow the single handset to communicate at high quality.

SUMMARY

A wireless telephone system comprises a base unit coupleable to one or more external telephone lines and having a base transceiver, and a plurality of wireless handsets which may be active or inactive. Each handset has a handset transceiver for establishing a time-division multiple access (TDMA) link, when said handset is active, over a shared RF channel with the base unit via the base transceiver. In communicating via a TDMA link, each active handset communicates during an exclusive time slice of a TDMA scheme that allocates time slices to active handsets, wherein a number of data samples having a sample size are transmitted during each time slice. At least two handsets alternatingly share a time slice, when one of said two handsets is to establish a new TDMA link and when establishing said new TDMA link would exceed the available channel capacity. Time slices are shared by reducing the sample size and thereby increasing the number of data samples transmitted during said shared time slices.

BRIEF DESCRIPTION OF THE DRAWINGS

FIG. 3 is a table illustrating a variable-structure TDMA time slice allocation scheme used by the system of FIG. 1, in accordance with an embodiment of the present invention; and FIG. 4 is a table illustrating a fixed-structure TDMA time slice allocation scheme used by the system of FIG. 1, in accordance with an embodiment of the present invention.

DESCRIPTION OF THE PREFERRED EMBODIMENT

Figure 1:
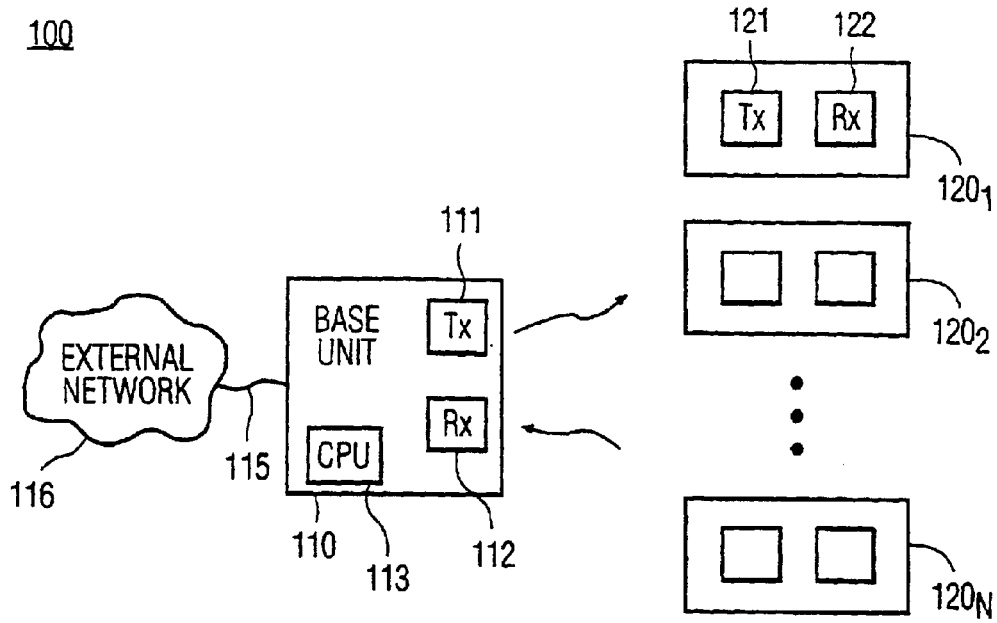
FIG. 1 is a block diagram of TDMA multi-line wireless telephone system, in accordance with an embodiment of the present invention.

Referring now to FIG. 1, there is shown a block diagram of TDMA multi-line wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. Base unit 110 also has a controlled microprocessor 113 for controlling and monitoring the overall functions of the base unit 110. System 100 also comprises N wireless handsets $120_1, 120_2, \ldots 120_N$. Each has a transmitter and receiver unit (transceiver), such as transmitter 121 and receiver 122 of handset $120_1$. In one embodiment, receiver unit 112 comprises N separate logical receivers, and transmitter unit 111 comprises N separate logical transmitters, so that receiver and transmitter units 112 and 111 provide N total logical transceiver units, one for each of N wireless handsets. At any given time, M handsets ($0 \leq M \leq N$) are operating (i.e., in the process of conducting a telephone call). Efficient power use is important for a wireless system since the handsets are typically battery-powered. In one embodiment, therefore, system 100 employs a digital TDMA scheme, as described in further detail below, which allows power to be efficiently used since each operating handset is "off" (i.e., not transmitting or receiving data) most of the time, and is only "on" during its own "time slice" or slot. System 100 thus provides a wireless network between the base station 110 and each handset $120_i$ ($1 \leq i \leq N$).

In the present invention, a IDMA scheme is employed that allows available channel capacity to be more efficiently utilized. This is done by reducing the quality of two or more handset signals and having them alternate each others' time slices, when a certain number of handsets are in operation, as explained in further detail below with reference to FIGS. 2–4.

Figure 2:
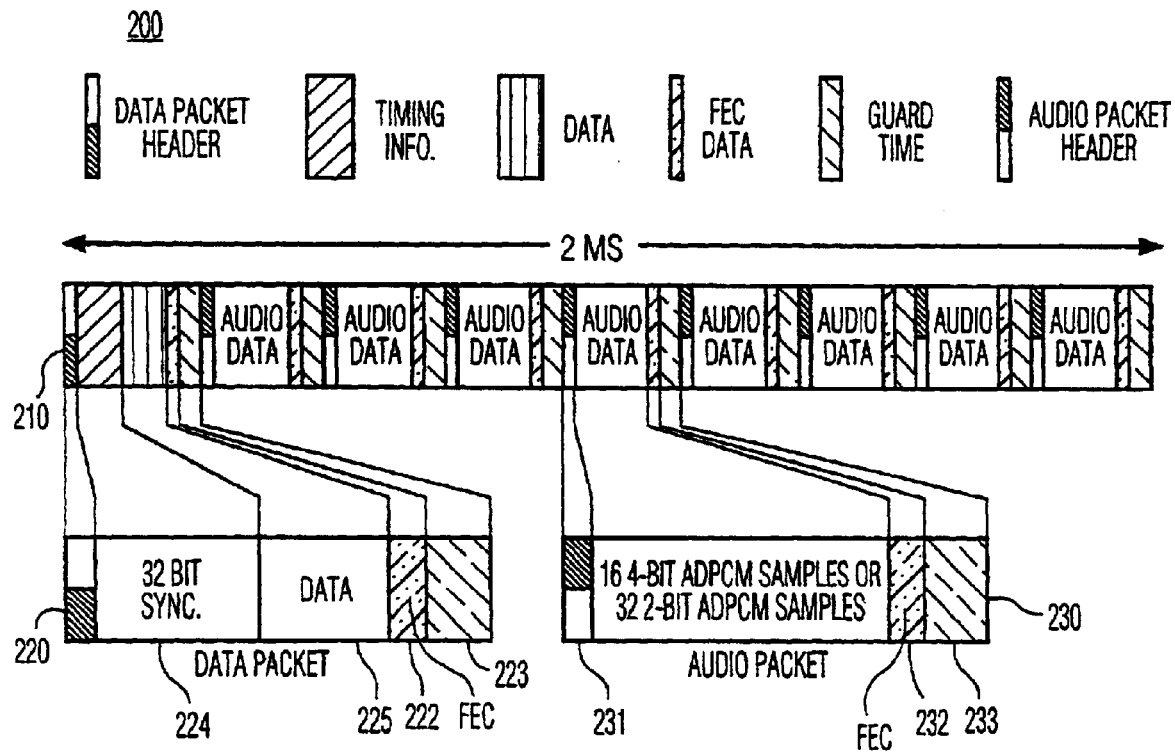
FIG. 2 is a schematic representation of the field, data packet, and audio packet structures used in the TDMA scheme of the system of FIG. 1.

Referring now to FIG. 2, there is shown a schematic representation 200 of the field, data packet, and audio packet structures used in the TDMA scheme of TDMA system 100 of FIG. 1. In one embodiment, a 2 ms field 210 of digital data comprises nine total packets, viz. a data packet 220 and eight audio packets such as audio packet 230. Each data packet is a set of data transmitted either to a given handset from the base unit or vice-versa, during a discrete time slice during which time no other handsets receive or transmit data over the system's data channel. Each audio packet is a set of audio data transmitted either to a given handset from the base unit or vice-versa, during a given time-slice in an overall "epoch" scheme, again during which time no other handsets receive or transmit data over the system's data channel.

As illustrated, each type of packet contains various subfields or sections. For example, data packet 220 comprises a 32-bit sync field (222, a data field 225, a FEC (forward error correction) field 222, and guard time 223. The data in data packet 220 is used to communicate between the base unit and a particular handset, and contains various types of information, such as caller ID type information, range and power information, and the like.

Audio packet 230 comprises an audio packet header 231, fit data section 232, and guard time 233. Audio packet header 231, for example, contains information identifying the audio packet (such as ifs the handset), the current place in the epoch, and the like.

In normal operation, each handset receives 16 digitally in compressed audio samples (such as ADPCM (adaptive differential pulse code modulation) samples) during each time slice of the epoch allocated for the handset to receive audio data; and transmits, to the base unit 16 ADPCM samples during each time slice of the epoch allocated for the handset to transmit audio data. In the present invention, however, when too many handsets are in operation for the channel capacity to carry, pairs of handsets share a time slice by alternating its use, and by doubling the number of samples to 32 per time slice (by lowering each sample's quality). ADPCM and related technical issues are described in detail in International Telecommunication Union (ITU), Recommendation G.727, (12/1990), "5-, 4-, 3- and 2-Bits Sample Embedded Adaptive Differential Pulse Code Modulation (ADPCM)," http://www.itu.ch.

Audio packet 230 therefore also comprises a main 64 bit "audio data" portion, which comprises either 16 4-bit ADPCM samples (high quality), or 32 2-bit ADPCM samples (low quality). The latter is the case when more handsets are operating than can operate at high quality over the allocated maximum channel capacity of system 100. Thus, in the present invention, each handset in operation operates at high quality when there are fewer than T handsets operating (calls in place), where $M \leq T$ and the maximum channel capacity is sufficient to handle up to T high quality calls or links simultaneously. However, when there are more than T handsets in operation (M>T), then selected pairs of handset channels are switched from high quality audio links to low quality audio links and alternate time slices. As will be appreciated, for a 2 ms field, high quality (16 4-bit ADPCM samples per audio packet or time slice) provides 32 Kbps ADPCM (the default audio data), and low quality (32 2-bit samples shared between two handsets, per audio packet) provides 16 Kbps.

Thus, at the limit, this embodiment of the present invention allows the maximum handset capacity at high quality to be doubled at low quality. In one embodiment of system 100, up to 4 handsets may conduct calls simultaneously at high quality, and up to 8 at low quality. For intermediate numbers, each additional handset added past 4 must pair up with one of the first 4 (e.g., if M=7, there are 3 handsets above the first 4, and thus 3×2=6 of the 7 handsets are operating at low quality).

Referring now to FIG. 3, there is shown a Table 300 illustrating a variable-structure IDMA time slice allocation scheme epoch used by system 100 of FIG. 1, in accordance with an embodiment of the present invention. Table 300 contains N pairs of rows, one pair of rows for each existing handset. Each row is a field, such as field 210 of FIG. 2. In the variable structure scheme of Table 300, N may be greater than 8. For example, N may be 12. Each row or field of the epoch may be referred to herein by the initial time slice or slot, which is used to transmit data (ID) to a given handset, or to receive data (RD) from a given handset. Thus, at the beginning of the field, data is transmitted (or received) from a specific handset. Thus, for example, base unit 110 transmits data to handset #1 (e.g., handset 120, of FIG. 1) in the first time slice of row TD1; and base unit 110 receives data from handset #1 in the first time slice of row RD1. Thus, each handset receives data and transmits data during one time slice of the entire Q-slice epoch, where Q=9×2×N. Thus, although any number N handsets may be added, the time delay between data communication for a given handset 120, and the base unit 110 is thereby lengthened. This can cause, for example, a longer time delay or latency for causing a given handset to ring or to be apprised of caller ID information.

In operation, a given handset polls at its specific data channel time slots for incoming calls and synchronization data from the base unit 110, and transmits audio packets over its specific data channel time slots when it initiates a call. The audio packet pairs (e.g., TS1, RS1) of each field 210 (each row of Table 300) can carry one conversation using 32 Kbps ADPCM, or two conversations using 16 Kbps ADPCM (see ITU Rec. G.727). In this embodiment, 16 4-bit samples are transferred every 2 ms each direction for a handset. Note that Table 300 shows the time sequence left to right, top to bottom, 2 milliseconds horizontally, and 2×2×N ms (=32 ms for N=8) vertically.

In one embodiment, system 100 implements the epoch of Table 300 as follows. The channel capacity of system 100 is sufficient to allow up to T=4 handsets to operate at high quality. Thus, for the first four handsets to come into operation, they are assigned nominal numbers 1 through 4. As each time slice of Table 300 is cycled through (left to right, top to bottom), both rows of each row pair use the allocation shown by the top entry in the TD row, i.e. the entry not in parentheses. Thus, we have the following sequence:

TD1, TS1, RS1, TS2, RS2, TS3, RS3, TS4, RS4;
RD1, TS1, RS1, TS2, RS2, TS3, RS3, TS4, RS4;
TD2, TS1, RS1, TS2, RS2, . . .
RDN, TS1, RS1, TS2, RS2, TS3, RS3, TS4, RS4;

where "TS1" denotes the time slice during which an audio signal or "sound" packet is transmitted by base unit 110 to handset #1; and "RS1" denotes the time slice during which an audio packet is received by base unit 110 from handset #1; and so forth.

However, each audio packet time slice entry of Table 300 contains two entries. The top entry in TD rows or fields indicates the "normal" allocation for the slot for both TD and RD rows, when $M \leq T$. This allocation is used for both TD and RD rows of a row pair. For example, if only 4 handsets are active (off hook), then, the sequence described above is followed, i.e. both the ID and RD rows follow the sequence indicated by the top entry in the TID row.

The bottom entry, in parentheses, indicates the alternate allocation for the slot when M>T. The top entry indicates the normal alternating allocation when M>T. If a fifth handset (handset #5) becomes operative, there is not enough channel capacity to handle all 5 active or operative handsets at high quality. Therefore, handsets 1 and 5 share a time slice on alternate fields, and each audio packet doubles the number of samples it transmits during the time slice. For example, in this case, during the first audio packet time slice of row TD1, the entry TS1 indicates that 32 2-bit audio ADPCM samples are transmitted to handset #1, instead of the usual 16 4-bit samples. During the first audio packet time slice of row RD1, the entry TS5 indicates that 32 2-bit audio ADPCM samples are transmitted to handset #5 during this time slice. Providing 32 2-bit ADPCM samples in the audio packets for handsets 1 and provides enough audio data for a 4 millisecond TDMA cycle. The system is dynamic, since, if handset #1 hangs up before handset #5, the base unit 110 can allocate 32 Kbps to handset #5 for the remainder of the call. Depending on when handset #5 becomes active, the order can switch, so that the entry in parenthesis is applicable.

Therefore, when M>T, system 100 may be said to be operating in a handset expansion mode. In normal mode, a total of 32 4-bit samples are transmitted to handset #1 every two fields (i.e., TS1 at high quality occurs twice). In handset expansion mode, 32 2-bit (low quality) samples are still transmitted to handset #1 every two fields, except this is done in a single audio packet rather than in two. As additional handsets are activated beyond the first 4, system 100 dynamically switches to handset expansion mode, and nominally numbers the newly-active handsets, which are then paired as illustrated with others' time slices, as illustrated. Thus, for example, if handset #6 becomes active, it shares alternating time slices with (and lowers the quality of) handset #2. In this case, we have:

TD1, TS1,* RS1,* TS2,* RS2,* TS3, RS3, TS4, RS4;
RD1, TS5,* RS5,* TS6,* RS6,* TS3, RS3. TS4, RS4;
TD2, TS1,* RS1,* TS2,* RS2,* TS3, RS3, . . .
RDN, TS5,* RS5,* TS6,* RS6,* TS3, RS3, TS4, RS4 where the asterisk indicates low-quality audio packets (i.e. 2-bit samples).

Thus, base unit 110 allocates transmit and receive slots to each subsequently active handset for audio transmission. If no handsets were in use, and handset $120_2$ starts a call, transmit and receive slots TS1 and RS1 would be dedicated to handset 1202 (i.e., handset #1) at 32 Kbps rate. Thus, for up to 4 active handsets, a high quality audio link of 32 Kbps is provided for each handset. As the 5th handset becomes activated, one existing channel is reduced to 16 Kbps and the $5^{th}$ handset is multiplexed into that channel with a 16 Kbps rate. If more than 8 handsets attempt transmission, they are blocked (all circuits busy signal). In such an embodiment where blocking is possible, receiver unit 112 preferably comprises less than N separate receivers (preferably 8), and transmitter unit 111 comprises less than N separate transmitters (preferably 8). In general, in any embodiment base unit 110 comprises a number of logical transceiver pairs equal to the maximum number of calls (links) that may be established simultaneously.

Thus, in the epoch of Table 300, in normal mode, each active handset has fixed time slots for each field 210 (i.e. row of Table 300) for audio data transfer. In expanded handset mode, the low quality handsets have fixed time slots for every other field 210 (i.e. row of Table 300) for audio data transfer.

In one embodiment, system 100 is adapted to dynamically re-nominate handsets to optimize channel capacity usage. For example, suppose 6 handsets are operating as described above, and thus 4 of the 6 handsets are operating in low-quality mode. Next, suppose handsets #3 and #4 deactivate. At this point, it makes no sense for handsets #1 and #5 to share time slices or operate at low quality mode, since time slices for TS3, RS3, TS4, RS4 are not being used. Thus, system 100 in this case dynamically re-numbers or re-nominates the four operating handsets as #s 1–4.

Thus, in the present invention, TDMA is used to separate the data and audio into two channels, and to allocate bandwidth as required to the handsets needing the channel. This technique is compatible with power saving protocols, since the data channel, which will always be available, is used to signal the handset and initiate calls. A specific time slot is provided for data for each handset, which is used to keep the TDMA in sync so that the handset transceiver communicates only during its designated time slice. Since the phones are battery operated, it is important that they transmit and listen only when they need to.

In one embodiment, the system 100 implements the epoch and scheme of Table 300 with a telephone system with 4 Plain Old Telephone System (POTS) lines (i.e., line 115). With four dedicated POTS lines, one can always expect 32 Kbps performance except when multiple handsets are in conference, or if some handsets are in intercom while others are in line conversations. In alternative embodiments, other line/handset combinations may be used.

In the above-described embodiment, 2 transmit/receive pairs per audio data packet slot were used. In alternative embodiments, there may be fewer or more transmit/receive pairs per data slot. For example, the audio data samples could be reduced further in quality to transmit more samples per audio packet, to allow more than 2 handsets (e.g. 4) to share a time slice. However, this may require higher compression algorithms, which would add considerable delay to the loop. Using ADPCM as described above minimizes delay in the loop and simplifies the audio echo cancellation problem, and both 16 Kbps and 32 Kbps algorithms exhibit the same delay, easily facilitating switching between algorithms.

Referring now to FIG. 4, there is shown a Table 400 illustrating a fixed-structure TDMA time slice allocation scheme epoch used by system 100 of FIG. 1, in accordance with an embodiment of the present invention. In this embodiment, there is less flexibility in terms of adding additional handsets beyond the channel capacity. However, it may be simpler to implement than the variable approach of Table 300, and does not permit blocking to occur.

The epoch scheme illustrated in Table 400 may be implemented similarly to that of Table 300, when N=8. In one embodiment of Table 400, time slots are dedicated to each handset for both data and audio. Thus, for example, if handsets #1 and #5 were the only handsets active, they would each be operating at 16 Kbps ADPCM, even though there is additional bandwidth or channel capacity available. However, although this may not be the most "efficient" way to use the channel, it allows for simplified control of the channel. In an alternative embodiment, system 100 in implementing the epoch of Table 400 may dynamically re-nominate handset numbers to more efficiently utilize the available bandwidth.

One skilled in the art will recognize that the wireless system described above according to the principles of the invention may be a cellular system where base unit 110 represents a base station serving one of the cells in a cellular telephone network.

It will be understood that various changes in the details, materials, and arrangements of the parts which have been described and illustrated above in order to explain the nature of this invention may be made by those skilled in the art without departing from the to principle and scope of the invention as recited in the following claims.

What is claimed is:

1. A wireless telephone system, comprising:
   (a) a base unit coupleable to one or more external telephone lines and having a base transceiver;
   (b) a plurality of wireless handsets operable in an active mode and an inactive mode, each having a handset transceiver for establishing a time-division multiple access (TDMA) link, when said handset is active, over a shared RF channel with the base unit via the base transceiver, in which each active handset communicates during an time slice of a TDMA scheme that allocates time slices to active handsets, wherein a number of data samples having a sample size are transmitted during each time slice; and
   (c) means for allowing at least two handsets to alternatingly share a time slice, when one of said two handsets is to establish a new TDMA link and when establishing said new TDMA link would exceed the available channel capacity, by reducing the sample size and thereby increasing the number of data samples transmitted during said shared time slices wherein the TDMA scheme comprises an epoch having a plurality of transmit and receive data row pairs, one such row pair for each handset, each row comprising a field of data and being divided into a specified number of time slices, wherein each field is 2 ms in length.

2. The system of claim 1, wherein the data samples are adaptive differential pulse code modulation (ADPCM) samples, each ADPCM sample having a number of bits.

3. The system of claim 1, wherein:
   the plurality of handsets comprises exactly N wireless handsets;
   the TDMA scheme comprises an epoch having N transmit data rows and N receive data rows;
   each active handset receives or transmits 16 4-bit ADPCM samples during each time slice for said handset when no handsets share time slices; and
   when at least two handsets share a time slice for one of said two handsets, each of said two handsets receives or transmits 32 2-bit ADPCM samples during each alternate shared time slice for each said handset.

4. The system of claim 1, wherein:
   the TDMA scheme comprises an epoch having a plurality of transmit and receive data row pairs, one such row pair for each handset; and
   each active handset receives data and transmits data via a data slice only once during each epoch, during the transmit and receive data row pair for each said active handset.

5. The system of claim 1, wherein the TDMA scheme is a variable TDMA scheme in which the number of handsets is greater than the maximum number of links that may be established over the channel.

6. The system of claim 1, wherein the TDMA scheme is a fixed TDMA scheme in which the number of handsets is equal to the maximum number of links that may be established over the channel.

7. The system of claim 1, wherein:
   the plurality of handsets comprises 8 handsets;
   up to 4 handsets operable in said active mode without sharing time slices; and
   up to 8 handsets operable in said active mode by sharing time slices.

8. The system of claim 1, wherein:
   the TDMA scheme comprises an epoch having a plurality of transmit and receive data row pairs, one such row pair for each handset;
   each handset is battery-powered; and
   each active handset turns on during the epoch only during its own time slice and turns off otherwise.

9. In a wireless telephone system having a base unit and a plurality of wireless handsets, wherein the base unit is coupleable to one or more external telephone lines and has a base transceiver, each of the plurality of wireless handsets are operable in an active mode and an inactive mode, and each handset comprises a handset transceiver, a method comprising the steps of:
   (a) establishing, with the handset transceiver for each active handset, a TDMA link over a shared RF channel with the base unit via the base transceiver, in which each active handset communicates during an exclusive time slice of a TDMA scheme that allocates time slices to active handsets, wherein a number of data samples having a sample size are transmitted during each time slice; and
   (b) allowing at least two handsets to alternatingly share a time slice, when one of said two handsets is to establish a new TDMA link and when establishing said new TDMA link would exceed the available channel capacity, by reducing the sample size and thereby increasing the number of data samples transmitted during said shared time slices wherein the TDMA scheme comprises an epoch having a plurality of transmit and receive data row pairs, one such row pair for each handset, each row comprising a field of data and being divided into a specified number of time slices, wherein each field is 2 ms in length.

10. The method of claim 9, wherein the data samples are adaptive differential pulse code modulation (ADPCM) samples, each ADPCM sample having a number of bits.

11. The method of claim 9, wherein:
   the plurality of handsets comprises exactly N wireless handsets;
   the TDMA scheme comprises an epoch having N transmit data rows and N receive data rows;
   each active handset receives or transmits 16 4-bit ADPCM samples during each time slice for said handset when no handsets share time slices; and
   when at least two handsets share a time slice for one of said two handsets, each of said two handsets receives or transmits 32 2-bit ADPCM samples during each alternate shared time slice for each said handset.

12. The method of claim 9, wherein:
   the TDMA scheme comprises an epoch having a plurality of transmit and receive data row pairs, one such row pair for each handset; and
   each active handset receives data and transmits data via a data slice only once during each epoch, during the transmit and receive data row pair for each said active handset.

13. The method of claim 9, wherein the TDMA scheme is a variable TDMA scheme in which the number of handsets is greater than the maximum number of links that may be established over the channel.

14. The method of claim 9, wherein the TDMA scheme is a fixed TDMA scheme in which the number of handsets is equal to the maximum number of links that may be established over the channel.

15. The method of claim 9, wherein:
the plurality of handsets comprises 8 handsets;
up to 4 handsets operable in said active mode without sharing time slices; and
up to 8 handsets operable in said active mode by sharing time slices.

16. The method of claim 9, wherein:
the TDMA scheme comprises an epoch having a plurality of transmit and receive data row pairs, one such row pair for each handset;
each handset is battery-powered; and
each active handset turns on during the epoch only during its own time slice and turns off otherwise.

* * * * *

UNITED STATES PATENT AND TRADEMARK OFFICE
CERTIFICATE OF CORRECTION

PATENT NO. : 6,847,627 B1
DATED : January 25, 2005
INVENTOR(S) : Paul Gothard Knutson and Kumar Ramaswamy It is certified that error appears in the above-identified patent and that said Letters Patent is hereby corrected as shown below:

Title page,
Item [22], PCT Filed Date, please correct from "Sep.1, 1996" to -- Sep.1, 1998 --.

Signed and Sealed this

Twelfth Day of April, 2005

JON W. DUDAS
*Director of the United States Patent and Trademark Office*